(12) United States Patent
Piedboeuf et al.

(10) Patent No.: US 9,863,563 B2
(45) Date of Patent: Jan. 9, 2018

(54) CONNECTING SYSTEM

(71) Applicant: Siemens Aktiengesellschaft, Munich (DE)

(72) Inventors: Wolfgang Piedboeuf, Köln (DE); Thomas Ruda, Moers (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/111,853

(22) PCT Filed: Jan. 13, 2015

(86) PCT No.: PCT/EP2015/050480
§ 371 (c)(1),
(2) Date: Jul. 15, 2016

(87) PCT Pub. No.: WO2015/110314
PCT Pub. Date: Jul. 30, 2015

(65) Prior Publication Data
US 2016/0334037 A1   Nov. 17, 2016

(30) Foreign Application Priority Data

Jan. 21, 2014  (EP) .................................... 14151885

(51) Int. Cl.
*F16L 21/04*     (2006.01)
*F16L 23/028*    (2006.01)

(52) U.S. Cl.
CPC ........... *F16L 23/0286* (2013.01); *F16L 21/04* (2013.01)

(58) Field of Classification Search
CPC .... F16L 23/0286; F16L 23/028; F16L 23/006
(Continued)

(56) References Cited

U.S. PATENT DOCUMENTS 870,557 A * 11/1907 Haus ..................... F16L 15/003
285/414
925,770 A   6/1909 Herrick
(Continued)

FOREIGN PATENT DOCUMENTS

CN         85105283 A      7/1986
CN         201066004 Y     5/2008
(Continued)

OTHER PUBLICATIONS

JP Notice of Allowance dated May 15, 2017, for JP patent application No. 2016-547527.
(Continued)

*Primary Examiner* — David E Bochna
(74) *Attorney, Agent, or Firm* — Beusse Wolter Sanks & Maire

(57) ABSTRACT

A connecting system is provided for detachably connecting a first pipe end to a second pipe end. The first pipe end has a sealing cone facing toward the second pipe end and a shoulder section. The connecting system includes a first clamping disk surrounding the first pipe end and a second clamping disk surrounding and connected to the second pipe end. The connecting system further includes a multiplicity of screws, detachably connecting the first clamping disk to the second clamping disk. The first clamping disk includes an outer circular disk ring and an inner circular disk ring which is detachably connected to the outer circular disk ring. The inner circular disk ring has multiple separate circular disk ring parts, and an outer diameter of the inner circular disk ring is greater than an outside diameter of the shoulder section provided on the first pipe end.

11 Claims, 3 Drawing Sheets

(58) Field of Classification Search
USPC .................................................. 285/414, 415
See application file for complete search history.

(56) References Cited

U.S. PATENT DOCUMENTS

| | | | | |
|---|---|---|---|---|
| 944,877 | A | * | 12/1909 | Koschinkski ....... F16L 19/0206 285/415 |
| 1,014,053 | A | | 1/1912 | Dolenský |
| 1,016,620 | A | * | 2/1912 | Gapp ..................... F16L 15/006 285/415 |
| 1,127,156 | A | | 2/1915 | Anderson et al. |
| 1,186,325 | A | * | 6/1916 | Metzger ................ F16L 15/006 285/415 |
| 1,821,867 | A | | 9/1931 | Wilson |
| 2,081,021 | A | * | 5/1937 | Smith ..................... F16L 23/12 285/415 |
| 2,568,414 | A | * | 9/1951 | Russ ..................... F16L 23/125 285/414 |
| 2,617,672 | A | | 11/1952 | Nichols |
| 3,004,780 | A | * | 10/1961 | Main ..................... F16L 33/207 285/415 |
| 3,393,929 | A | * | 7/1968 | Read ..................... F16L 23/006 285/114 |
| 3,418,009 | A | * | 12/1968 | Pollia ................. F16L 23/0286 285/414 |
| 3,966,234 | A | * | 6/1976 | Sundholm ........... F16L 23/0286 285/415 |
| 4,183,560 | A | * | 1/1980 | Wyss ..................... F16L 21/04 285/414 |
| 4,452,474 | A | * | 6/1984 | Hagner ............... F16L 23/0286 285/334.1 |
| 4,488,743 | A | * | 12/1984 | Schulke .................. F16L 49/04 285/414 |
| 4,779,903 | A | | 10/1988 | Maier et al. |
| 5,492,373 | A | | 2/1996 | Smith |
| 6,389,964 | B1 | | 5/2002 | Tohoku |
| 7,819,437 | B2 | * | 10/2010 | Weil .................... F16L 23/0286 285/414 |
| 2013/0127157 | A1 | * | 5/2013 | Oakes .................. F16L 23/028 285/414 |

FOREIGN PATENT DOCUMENTS

| | | | | |
|---|---|---|---|---|
| CN | 202203555 U | | 4/2012 | |
| DE | 1127156 B | | 4/1962 | |
| DE | 4127498 A1 | | 2/1993 | |
| DE | 10144039 A1 | | 5/2003 | |
| FR | 1327104 A | | 5/1963 | |
| FR | 1327104 A1 | | 5/1963 | |
| FR | 2338446 A2 | | 8/1977 | |
| GB | 777023 A | * | 6/1957 | .......... F16L 23/0286 |
| GB | 1350199 A | * | 4/1974 | .......... F16L 23/0286 |
| JP | S62104090 U | | 7/1987 | |
| JP | H073111 Y2 | | 1/1995 | |
| JP | 2000230681 A | | 8/2000 | |
| JP | 2009052571 A | | 3/2009 | |
| JP | 2009121528 A | | 6/2009 | |
| JP | 4410352 B2 | | 2/2010 | |
| NO | 0129469 A2 | | 4/2001 | |
| WO | 0129469 A2 | | 4/2001 | |
| WO | 2008008289 A2 | | 4/2001 | |
| WO | 2008008289 A1 | | 1/2008 | |
| WO | 20080082889 A2 | | 1/2008 | |

OTHER PUBLICATIONS

CN Office Action dated Jul. 24, 2017, for CN patent application No. 201580005225.9.

* cited by examiner

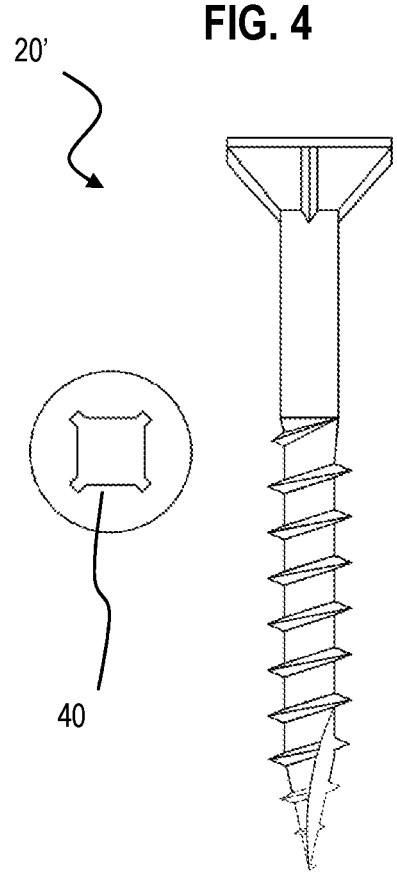

CONNECTING SYSTEM

CROSS REFERENCE TO RELATED APPLICATIONS

This application is the US National Stage of International Application No. PCT/EP2015/050480 filed Jan. 13, 2015, and claims the benefit thereof. The International Application claims the benefit of European Application No. EP14151885 filed Jan. 21, 2014. All of the applications are incorporated by reference herein in their entirety.

FIELD OF INVENTION

The invention relates to a connecting system for detachably connecting a first pipe end to a second pipe end, wherein the first pipe end comprises a sealing cone which faces the second pipe end and has a shoulder portion on its outside surface.

BACKGROUND OF INVENTION

Connecting systems of the named type are disclosed, for example, in DE 101 44 039 A1 under the designation of "cone sealing coupling". They serve for detachably connecting two hollow cylindrical pipe ends. To this end, a rotationally symmetrical connection element, which is realized in a conical and hollow manner, is connected to the first pipe end by means of friction welding once a cap nut has been placed onto the pipe end.

The side of the cone of the connection element with the smaller diameter is dimensioned such that it is able to be inserted into the oppositely-situated second pipe end. Proceeding from said side, the connection element is widened conically until beyond the diameter of the first pipe end, to which it is connected by means of friction welding. After the welding this creates a shoulder portion which serves as a support surface for holding the cap nut.

The second pipe end comprises an external thread which is realized so as to match the internal thread of the cap nut. After welding, the connection element, which is now connected in a materially-bonded manner to the first pipe end, is inserted into the second pipe end and the cap nut is screwed to the second pipe end. The screw connection presses the connection element into the second pipe end such that a sealed connection is created.

The described connection comprises several disadvantages which are shown as early as at assembly: on account of the high tightening torque of 340 Nm and of the frequently restricted installation space, special tools are necessary both at initial commissioning and replacement. Particular problems arise when flexible hoses and not solid pipes are to be connected: Torsion-free assembly is difficult as a result of difficult assembly conditions (overhead assembly, accessibility) for the required tightening torque. All in all, correct tightening of the connection is consequently not ensured in every case.

Further disadvantages are produced with regard to the causes of failure: along with the usual causes of failure of sealing cone couplings with cap nuts such as vibration, setting, relaxation and creeping, temperature-transient mechanisms in particular are responsible for failure. Up to now, this has only been countered by using a correspondingly high tightening torque and—in the case of particularly high dynamic loads and/or large temperature-transient mechanisms—cap nuts in conjunction with a lock nut. However, the safety effect of the lock nuts has not been verified in this case.

Approaches to solve these types of disadvantages are disclosed, for example, in documents DE 41 27 498 A1, FR 2 338 446, U.S. Pat. No. 925,770 and U.S. Pat. No. 2,617,672. The teaching there is to clamp the two pipe ends by means of two clamping disks, the two clamping disks acting upon a pipe end each with a clamping force and both clamping disks being screw-connected together beyond the joint of the pipe ends. The clamping force acts, in this connection, for instance, in the region of a shoulder portion at the pipe end, by means of which shoulder portion a clamping disk introduces the clamping force into the relevant pipe end.

It is, however, disadvantageous both in the case of cap nuts used up to now and in the case of the clamping disks disclosed in the prior art that the replacement of the cap nuts or of the clamping disk at the pipe end is linked with high expenditure as in the majority of cases the cap nuts or the clamping disk have to be tightened over the pipe ends in a precisely determined chronological order so that they are able to be removed from the unit or screw-connected to the unit afterwards as intended. A welding coupling, should such a one be chosen, must additionally be isolated and, after replacement of the cap nuts or clamping disk, re-welded and checked.

These types of disadvantages can be avoided to some extent by the clamping disk devices of FR 1,327,104 and U.S. Pat. No. 1,821,867, as in the case of said devices at least one clamping disk is realized as a separate circular disk ring which is detachably connected to the remaining clamping ring. Said circular disk ring can also include, for example, two separate semi-circular disk rings and is inserted into corresponding indentations in the respective pipe ends. Once the clamping disk has clamped, the clamping force is then applied from the clamping disk via the circular disk rings onto the walls of the relevant indentations in the pipe ends.

A disadvantage of said clamping disk devices, however, is the fact that the circular disk rings have to be inserted into specially provided cutouts in the pipe ends so that they are able to obtain a corresponding force transmission. In addition, the pipe ends and the clamping disks have to be machined using corresponding shaping techniques so that they are able to interact with the circular disk ring to transmit force. In addition, a precisely determined chronological order, in which individual components have to be tightened sequentially in each case over the pipe ends, has also to be adhered to in the case of said clamping disks so that they are able to be screw-connected to or detached from the pipe ends as intended.

SUMMARY OF INVENTION

It is consequently an object of the invention to provide a connecting system of the type named in the introduction which ensures the function and safety of the connection between two pipe or hose ends and is particularly simple to assemble and disassemble.

Said object is achieved according to the invention by a connecting system according to the independent claim. In particular, an object of the invention is achieved by a connecting system including a first pipe end and a second pipe end, both of which are provided for realizing a detachable connection, wherein the first pipe end comprises a sealing cone which faces the second pipe end and has a shoulder portion on its outside surface, including a first clamping disk which surrounds the first pipe end in a flush manner and is arranged on the side of the shoulder portion remote from the sealing cone, a second clamping disk which surrounds the second pipe end and is connected to the same, and a plurality of screws which connect the first clamping disk to the second clamping disk so as to be detachable, the portion of the first clamping disk which surrounds the first pipe end is realized as a separate circular disk ring which is detachably connected to the remaining clamping disk, wherein the circular disk ring includes several part circular disk rings, in particular two separate semi-circular disk rings, (part circular disk ring which surrounds half of the first pipe end) and wherein the outside diameter of the circular disk ring is greater than the diameter of the shoulder portion which is provided on the first pipe end. The part circular disk rings can essentially comprise an arbitrary number which, when assembled together, surround the first pipe end. For practical reasons, said number will probably not be more than 10 as otherwise the expenditure on assembly would be too high. It is advantageous that there are precisely two part circular disk rings which each surround precisely half of the first pipe end. In said case, these are two semi-circular disk rings.

The invention proceeds, in this case, from the consideration that a particularly long service life of the sealing cone coupling precisely in the case of strong temperature-transient operations could be achieved by an increase in resilience. Cap nuts, as every nut, are, as a rule, rigid bodies with a comparatively small amount of resilience. An increase in resilience could be achieved, for example, as a result of an increase in the nut height and also by a reduction in a radial or axial cross section, this only being achieved, however, with a simultaneous loss in strength and/or where force is introduced asymmetrically onto the nut support surface, with a bending moment and additional securement as a result of loads that are distributed on threads. To avoid said disadvantages, the thread tightening torque necessary for tightening the cap nut is consequently distributed to several screws which are arranged around the coupling. The screws are arranged on two circular ring-shaped clamping disks with corresponding openings and threads which are arranged and secured on the pipe or hose ends in the manner of a flange. One of the clamping disks can be fastened on the thread of the second pipe end, the other clamping disk is held on the shoulder portion of the connection element in an analogous manner to the cap nut used previously.

According to the invention, it is additionally provided that the outside diameter of the circular disk ring is greater than the diameter of a shoulder portion which is provided on a pipe end, such that the clamping disk without the circular disk ring comprises a correspondingly large inside diameter and is able to be pushed over a shoulder portion. The largest or the average outside diameter of the circular disk ring is meant in particular in this connection. The part circular disk rings or semi-circular disk rings are only inserted then subsequently in this case and are fixed to the remaining clamping disk such that the latter is held on the shoulder portion. This results in the connecting system being flexible to handle which enables easy assembly. In addition, the clamping disks can also not be tightened onto the pipe ends until subsequently such that a precise sequence during assembly does not necessarily have to be adhered to.

In an advantageous manner, the screws are realized in this case as expansion screws. This is to be understood as a noticeably resiliently expandable screw which comprises a narrow and particularly long shank for this purpose. The diameter of the screw shank is smaller than that of the thread. The achievement here is that the tensile force generated in the expanded shank as a result of tightening is only reduced a little when setting takes place subsequently in the coupling as a result of plastic deformation. In the case of an alternating load produced by a force that varies over time, the expansion screw expands further or it contracts somewhat, without becoming over-expanded or loose, it behaves in the coupling consequently as a soft, pre-tensioned tensile spring. This is particularly advantageous precisely in the case of temperature-transient mechanisms.

In an advantageous development, the screws are distributed uniformly along the circumference of the pipe ends, i.e. the axes of the screws are situated at regular spacings on a circle around the respective pipe end. This achieves a uniform distribution of the tensile stress along the circumference, as a result of which the stability and longevity of the connecting system is further improved.

In a further advantageous development, the screws comprise an inner drive, i.e. instead of being tightened or loosened with a wrench, a screwdriver is used, e.g. cross slot, torx or hexalobular. In one embodiment, FIG. 4 depicts a screw 20' with a cross slot 40 that is configured to be tightened or loosened with a screwdriver. This is advantageous in installation situations with very tight space as the screw head diameter and the diameter of the clamping disks can consequently also be correspondingly reduced.

For securing the screws, they are provided in an advantageous manner with wedge lock washers. The washers have radial ribs on their outside surface and on their inside surface wedge faces, the gradient of which is always greater than the thread pitch. The washers, which are bonded in pairs, are placed under the screw head. When tightened, a positive locking connection is formed on account of the radial ribs. The pair of disks then sits fixedly in its place and movements are only still possible between the wedge faces. Even with the smallest turn in the releasing direction, the clamping force is increased and the screw consequently secures itself on account of the wedge effect.

A positive locking fixing is provided in this connection according to the invention for fixing the part circular disk rings or semi-circular disk rings on the remaining clamping disk. Part of such a positive locking connection is formed, in particular, by the screw heads, which are arranged in an advantageous manner on the first circular disk and extend above the circular disk ring. When the screws are tightened, they therefore cover the part circular disk rings or semi-circular disk rings in a flush manner and hold them in their position.

For additional hold, the contact surface between the circular disk ring and the remaining clamping disk is advantageously realized in a conical manner. Ideally, the tapering in this case is arranged remotely from the screw heads such that the circular disk ring is only able to be removed out of its position in the clamping disk in the direction of the screw heads, but is held there by the screw heads.

As an alternative to this or in addition to it, the contact surface between the circular disk ring and the remaining clamping disk advantageously includes a ring-shaped support surface. Said support surface also serves for the positive locking hold of the circular disk ring in the clamping disk.

In a further advantageous development, the contact surface between the circular disk ring and the remaining clamping disk additionally comprises a thread. Said thread can serve as a captive device during installation.

The advantages obtained with the invention also consist in particular in that as a result of the arrangement of the clamping disks in the manner of a flange on a sealing cone connection and the connection thereof by means of screws, spatial separation of the resilient elements (screws) away from the rapid temperature change toward a constant temperature is achieved. The tensile force is distributed from an, until now, individual cap nut onto many discrete expansion elements which are arranged outside the temperature-transient region. Consequently, no stresses caused by rapid temperature changes underlie the connection and the connection is resistant to temperature-transient mechanisms.

By using several expansion elements, the tightening torque, which was originally to be applied to one cap nut, is reduced to a fraction of the original tightening torque. Consequently, it is possible to use conventional tools on construction sites in particular where the installation space is small and there is limited accessibility and difficult assembly conditions.

As a result of displacing the bend axis into the expansion elements and as a result of resilient deformation of the upper and lower clamping disks during tightening, the stress is distributed to threads that up to now have not been loaded. The resilience and the safety of the connection are additionally increased. The elements to be connected are connected in a torsion-free manner such that the connecting system is especially suitable for flexible hoses.

If there is a leak in the sealing cone coupling in the event of damage (e.g. damaged cone of the welding coupling), the installation or replacement of metal seals with a higher assembly preload force is easily realizable on account of the large reserves or as a result of replacing suitable resilient elements. All in all, a highly resilient, universally usable connection is created, the resilience of which is obtained without restricting the strength.

By using several part circular disk rings or in particular two semi-circular disk ring-shaped segments in the inner region of the holding disk on the sealing cone, it is additionally possible to carry out a simple exchange without removing the welded sealing cone. The connecting system is consequently especially simple to fit in retro.

Finally, the assembly of the connecting system is simplified, as standard tools that are comparatively easy to manage with tightening torques that are easy to apply are also able to be used in restricted installation spaces. Assembly errors are reduced as a result.

BRIEF DESCRIPTION OF THE DRAWINGS

The invention is explained in more detail by way of exemplary embodiments in a drawing, in which:

FIG. 4 shows a screw including an inner drive to be tightened with a screwdriver.

Identical parts are provided with the same references in all the figures.

DETAILED DESCRIPTION OF INVENTION

Figure 1:
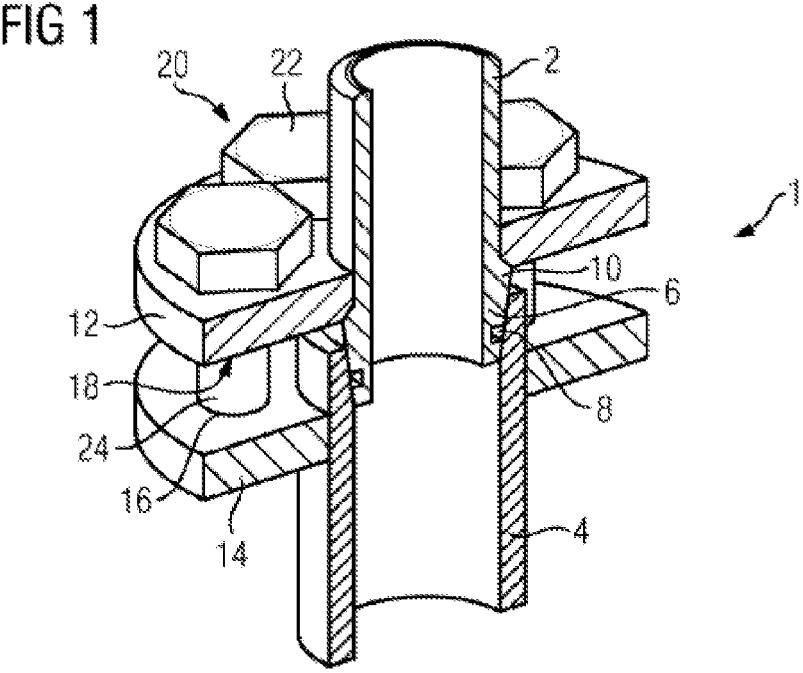
FIG. 1 shows a sectional drawing of a connecting system for a sealing cone coupling with two clamping disks and expansion screws, said connecting system not being put under any stress in the present case.

FIG. 1 shows a sectional view of a connecting system 1, which is not under any stress in the present case, for the detachable, sealed connection of a first pipe end 2 to a second pipe end 4. The pipe ends 2, 4 can also be ends of flexible hoses which are connected together, the term pipe end is therefore also to be understood as synonymous with the term hose end. Both pipe ends 2, 4 are hollow cylindrical. The first pipe end 2 comprises a concentrically connected sealing cone 6 which tapers toward the completion of the pipe end 2 so far that the outside diameter thereof is smaller than the inside diameter of the second pipe end 4. The first pipe end 2 with the sealing cone 6 can consequently be inserted concentrically into the second pipe end 4.

The sealing cone 6 additionally comprises a circumferential groove 8 into which a sealing material is inserted. The largest outside diameter of the sealing cone 6 is greater than the outside diameter of the remaining pipe end such that a circumferential shoulder portion 10 is produced. In the outside profile, the first pipe end 2 with the sealing cone 6 consequently resembles a partially cut-off arrow tip. The sealing cone 6 can be connected to the pipe end 2, for example, as a result of friction welding.

The second pipe end 4 comprises, in contrast, a thread 32b on its outside surface. In the case of connecting systems 1 known up to now, a cap nut, which is held on the shoulder portion of the sealing cone 6 of the first pipe end 2, is screwed onto the thread 32b of the second pipe end 4. The two pipe ends 2, 4 are connected together as a result.

Figure 2:
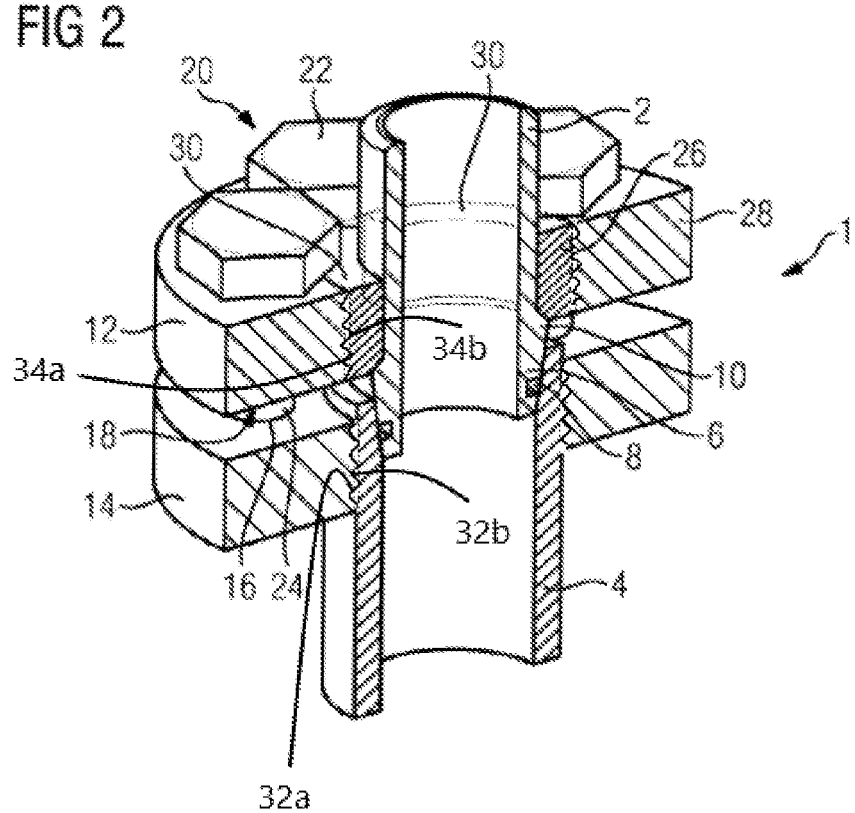
FIG. 2 shows a sectional drawing of a top view of a connecting system according to the invention for a sealing cone coupling with two clamping disks and expansion screws where a clamping disk comprises two inner semi-circular disk segments.

In FIG. 1 a first clamping disk 12 and a second clamping disk 14 are provided instead of this. Both clamping disks 12, 14 are in the form of a circular disk ring, the inside diameter of the first clamping disk 12 corresponding to the outside diameter of the first pipe end 2 and the inside diameter of the second clamping disk 14 corresponding to the outside diameter of the second pipe end 4. In FIG. 2, in one embodiment, the inside opening of the second clamping disk 14 comprises a thread 32a with which it is screwed onto the outside thread 32b of the second pipe end 4.

The second clamping disk 14 additionally comprises a total of six bores 16 which are arranged at uniform spacings around the axis of the second clamping disk 14 and bear a thread. The first clamping disk 12 comprises congruent bores 18 which are not, however, provided with a thread, but rather are so large that it is possible to insert through each of the bores 18 a screw 20 which is screwed into the thread of the respective bore 16 in the second clamping disk 14. The bore 18, however, is smaller than the screw head 22 of the respective screw 20.

The clamping disks 12, 14 are connected together as a result. As the first clamping disk 12 is held on the shoulder portion 10, the tightening of the screws 20 results in the sealing cone 6 being pressed into the second pipe end such that a sealed, secure connection is achieved here.

The screws 20 are realized, in this case, as expansion screws, i.e. the screw shank 24 is kept narrower than the thread in the bores 16. The screws 20 comprise a certain resilience as a result. The screw heads 22 are developed for an external drive, here as an external octagon. In an embodiment which is not shown, screws 20 are also used with an internal drive, which makes it possible, precisely in the case of restricted installation space, to dimension the clamping disks 12, 14 smaller as a result of reducing the size of the spacings between the bores 16, 18.

For securing the screws 20, in an embodiment which is not shown they can also be provided with wedge lock washers which are placed under the screw heads 22.

FIG. 2 shows a sectional representation of an embodiment according to the invention which differs from FIG. 1 as a result of the first clamping disk 12 being realized with several parts. For the rest, the embodiment is identical with that of FIG. 1 such that there is no separate description of the identical parts. The embodiments which are described as alternatives can also be used in the embodiment of FIG. 2.

The first clamping disk 12 consists of a total of three segments in the embodiment of FIG. 2. First of all, the first clamping disk 12 is divided into an inner circular disk ring 26 and an outer circular disk ring 28 which are nested in one another in a concentric manner so as to be flush. The inner circular disk ring 26 is divided, in this case, into several part circular disk rings 30, in particular into two semi-circular disk rings 30. The diameter of the joint face, which is in the form of an outside cylinder surface, between the circular disk rings 26, 28 is, in this case, greater than the outside diameter of the shoulder portion 10. This means that the outer circular disk ring 28 can be pushed over the sealing cone 6.

The advantage of the described development of the first clamping disk 12 in FIG. 2 is that it is possible to replace the first clamping disk 12 without detaching the sealing cone 6 from the first pipe end 2. The outer circular disk ring 28 can be pushed in particular over the sealing cone 6. The part circular disk rings 30 or semi-circular disk rings 30 are connected to the outer circular disk ring 28 only subsequently.

The connection between the part circular disk rings 30 or semi-circular disk rings 30 and the outer circular disk ring 28 can be effected in different ways. In the exemplary embodiment in FIG. 2, the part circular disk rings 30 or semi-circular disk rings 30 can comprise an external thread 34*b* and the outer circular disk rings 28 can comprise an internal thread 34*a*. This serves initially as a captive device. A further securement of the connection between the part circular disk rings 30 or semi-circular disk rings 30 and the outer circular disk ring 28 is effected as a result of the correspondingly large dimensioning of the screw heads 22 in such a manner that they project beyond the joint line between the part circular disk rings 30 or semi-circular disk rings 30 and the outer circular disk ring 28. This produces a positive locking connection which prevents the part circular disk rings 30 or semi-circular disk rings 30 falling out in the direction of the first pipe end 2.

In alternative embodiments which are not shown, the joint face between the part circular disk rings 30 or semi-circular disk rings 30 and the outer circular disk ring 28 can comprise a conical form instead of the realization in the form of a cylinder outside surface in FIG. 2 or a ring-shaped support surface can be provided. Both embodiments only allow the part circular disk rings 30 or semi-circular disk rings 30 to be removed out of the outer circular disk ring 28 in one single axial direction.

Figure 3:
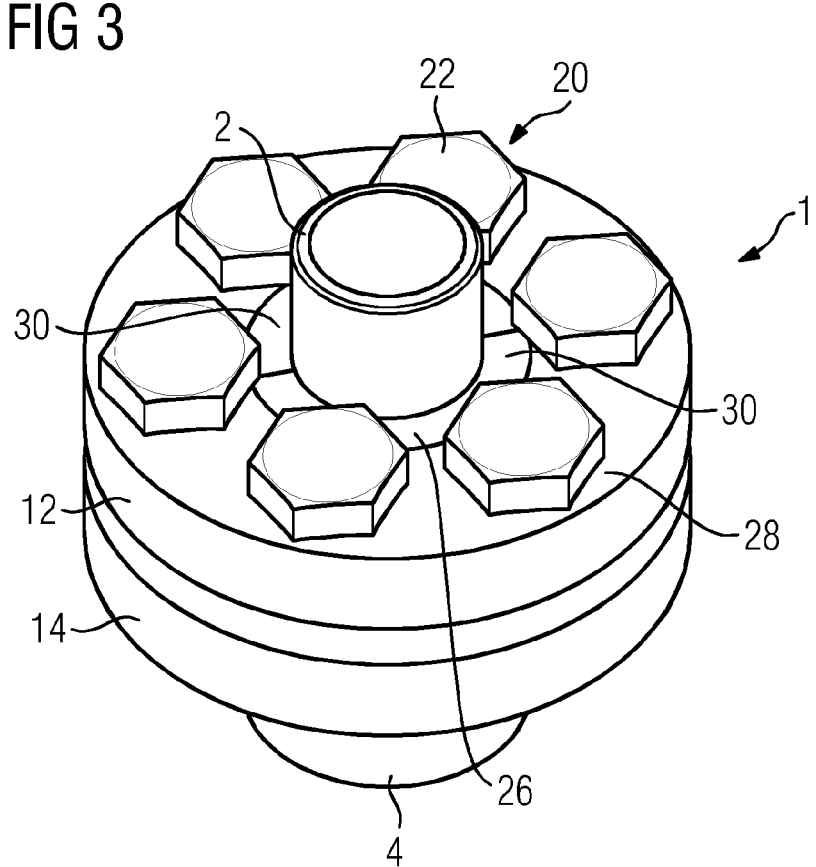
FIG. 3 shows a top view of the connecting system from FIG. 2.

Finally, FIG. 3 shows a top view of the embodiment in FIG. 2 which clarifies the position and form of the screws 20 and of the part circular disk rings 30 or semi-circular disk rings 30.

The invention claimed is:

1. A connecting system comprising:
   a first pipe end and a second pipe end, both of which are provided for creating a detachable connection, wherein the first pipe end comprises a sealing cone which faces the second pipe end and said first pipe end is inserted with the sealing cone in a concentric manner into the second pipe end and comprises on its outside surface a circumferential shoulder portion, wherein the largest outside diameter of the sealing cone is greater than the outside diameter of the remaining first pipe end such that the shoulder portion is produced,
   a first clamping disk which surrounds the first pipe end and is arranged on the side of the shoulder portion remote from the sealing cone,
   a second clamping disk which surrounds the second pipe end and is connected to the same, and
   a plurality of screws which connect the first clamping disk to the second clamping disk so as to be detachable,
   wherein the first clamping disk which surrounds the first pipe end includes an inner circular disk ring and an outer circular disk ring wherein the inner circular disk ring is detachably connected to the outer circular disk ring in a concentric manner such that the inner circular disk ring is flush with the outer circular disk ring, wherein the inner circular disk ring includes several separate part circular disk rings, wherein the several separate part circular disk rings include two separate semi-circular disk rings, and wherein an outside diameter of the inner circular disk ring is greater than an outside diameter of the shoulder portion which is provided on the first pipe end.

2. The connecting system as claimed in claim 1, wherein the screws are distributed uniformly along the circumference of the pipe ends.

3. The connecting system as claimed in claim 1, wherein the screws include wedge lock washers.

4. The connecting system as claimed in claim 1, wherein the heads of the screws are arranged on the first circular disk and extend above the inner circular disk ring.

5. The connecting system as claimed in claim 1, wherein a contact surface between the inner circular disk ring and the outer circular disk ring comprises a conical form.

6. The connecting system as claimed in claim 1, wherein a contact surface between the inner circular disk ring and the outer circular disk ring comprises a ring-shaped support surface.

7. The connecting system as claimed in claim 1, wherein a contact surface between the inner circular disk ring and the outer circular disk ring comprises a thread.

8. The connecting system as claimed in claim 1, wherein an outside surface of the second pipe end includes an outside thread and wherein an inside opening of the second clamping disk includes a thread configured to be screwed onto the outside thread of the second pipe.

9. The connecting system as claimed in claim 1, wherein the sealing cone comprises a circumferential groove to insert a sealing material.

10. A connecting system comprising:
    a first pipe end and a second pipe end, both of which are provided for creating a detachable connection, wherein the first pipe end comprises a sealing cone which faces the second pipe end and said first pipe end is inserted with the sealing cone in a concentric manner into the second pipe end and comprises on its outside surface a circumferential shoulder portion, wherein the largest outside diameter of the sealing cone is greater than the outside diameter of the remaining first pipe end such that the shoulder portion is produced,
    a first clamping disk which surrounds the first pipe end and is arranged on the side of the shoulder portion remote from the sealing cone,
    a second clamping disk which surrounds the second pipe end and is connected to the same, and
    a plurality of expansion screws which connect the first clamping disk to the second clamping disk so as to be detachable, wherein the first clamping disk which surrounds the first pipe end includes an inner circular disk ring and an outer circular disk ring wherein the inner circular disk ring is detachably connected to the outer circular disk ring, wherein the inner circular disk ring includes several separate part circular disk rings, wherein the several separate part circular disk rings include two separate semi-circular disk rings, and wherein an outside diameter of the inner circular disk ring is greater than an outside diameter of the shoulder portion which is provided on the first pipe end.

11. A connecting system comprising:

a first pipe end and a second pipe end, both of which are provided for creating a detachable connection, wherein the first pipe end comprises a sealing cone which faces the second pipe end and said first pipe end is inserted with the sealing cone in a concentric manner into the second pipe end and comprises on its outside surface a circumferential shoulder portion, wherein the largest outside diameter of the sealing cone is greater than the outside diameter of the remaining first pipe end such that the shoulder portion is produced, a first clamping disk which surrounds the first pipe end and is arranged on the side of the shoulder portion remote from the sealing cone, a second clamping disk which surrounds the second pipe end and is connected to the same, and a plurality of screws which connect the first clamping disk to the second clamping disk so as to be detachable, wherein the screws comprise an inner drive such that the screws are configured to be tightened or loosened with a screwdriver, wherein the first clamping disk which surrounds the first pipe end includes an inner circular disk ring and an outer circular disk ring wherein the inner circular disk ring is detachably connected to the outer circular disk ring such that the inner circular disk ring is flush with the outer circular disk ring, wherein the inner circular disk ring includes several separate part circular disk rings, wherein the several separate part circular disk rings include two separate semi-circular disk rings, and wherein an outside diameter of the inner circular disk ring is greater than an outside diameter of the shoulder portion which is provided on the first pipe end.

* * * * *